(12) United States Patent
Seki

(10) Patent No.: US 6,602,332 B2
(45) Date of Patent: Aug. 5, 2003

(54) SOLID GLITTER MARKER

(75) Inventor: Koji Seki, Saitama-ken (JP)

(73) Assignee: Buncho Corporation (JP)

( * ) Notice: Subject to any disclaimer, the term of this patent is extended or adjusted under 35 U.S.C. 154(b) by 47 days.

(21) Appl. No.: 09/876,994

(22) Filed: Jun. 11, 2001

(65) Prior Publication Data

US 2003/0029354 A1 Feb. 13, 2003

(51) Int. Cl.⁷ .............................................. C09D 13/00
(52) U.S. Cl. ................................. 106/31.07; 106/31.86
(58) Field of Search ............................ 106/31.07, 31.86

(56) References Cited

U.S. PATENT DOCUMENTS

| | | | | | |
|---|---|---|---|---|---|
| 4,212,786 A | * | 7/1980 | Murakami | .................. | 523/164 |
| 4,840,669 A | * | 6/1989 | Hughes et al. | .............. | 106/31.1 |
| 4,840,670 A | * | 6/1989 | Hughes et al. | ........... | 106/31.01 |
| 4,859,242 A | * | 8/1989 | Hughes et al. | ................. | 524/55 |
| 5,336,306 A | * | 8/1994 | Hughes et al. | .............. | 523/164 |

* cited by examiner

*Primary Examiner*—Mark L. Bell
*Assistant Examiner*—Veronica F. Faison
(74) *Attorney, Agent, or Firm*—H. Jay Spiegel

(57) ABSTRACT

A solid glitter marker comprising a gel-forming material that contains (A) at least one kind of gelling agent selected from the group consisting of a dibenzylidene sorbitol, derivatives thereof, tribenzylidene sorbitol and derivatives thereof, (B) water, (C) a water-miscible organic solvent, (D) a high0molecular adhesive and (E) a glitter, the gel-forming material having a bending strength under JIS S-6026 of 160 to 700 g and a crushing strength which is not larger than 10 times as large as the bending strength.

10 Claims, 1 Drawing Sheet

SOLID GLITTER MARKER

BACKGROUND OF THE INVENTION

1. Field of the Invention

The present invention relates to a solid glitter marker. More specifically, the invention relates to a solid glitter marker which, in its form, can be used to favorably draw a picture on an object such as a paper, the picture that is drawn exhibiting a glittering effect on a transparent background and being intimately adhered to the object maintaining resistance against being peeled off.

2. Description of Prior Art

Drawing materials blended with a glitter have been known already.

U.S. Pat. No. 5,383,954 discloses an invention entitled "Solid Marking Composition Containing Glitter", which is a solid drawing composition comprising various waxes as base materials, softening agents such as various kinds of oils, a pigment and a glitter.

There have also been placed in the market the drawing materials obtained by dispersing a glitter in the liquid paste, and packaging the liquid paste in a polypropylene tube.

The glitter is obtained by evaporating aluminum on a polyethylene terephthalate film and, further, imparting a color thereon when it is desired to obtain the glitter having a chromatic color. The glitter has a size that is very larger than that of a pigment that is usually used for the drawing materials, i.e., has a size of from 0.008×0.008 mm through up to about 1.5×1.5 mm. The thickness is about one-tenth the length of the side.

When a solid drawing material such as crayon blended with the glitter is used for drawing pictures on an object, the glitter is not transferred onto the surface of the object but, instead, driven deep into the drawing material.

According to the former prior art, the glitter can be utilized to some extent by selecting the hardness of the drawing material to be as soft as 25 to 45 mm in the needle-insertion testing stipulated under ASTM D1321-85. However, the glitter can be used when it has a size of as relatively small as 0.05×0.05 mm or less. The glitter cannot be transferred onto the object when it has a size larger than the above value. Even the glitter having a size of not larger than 0.05×0.05 mm tend to be easily driven into the drawing material when it is used for drawing a picture, and the glittering effect of the glitter cannot be exhibited to a satisfactory degree.

According to the former prior art, further, a wax having poor transparency is used as a base material. The surfaces of the glitter are covered with this opaque wax, and light reflected by the glitter is partly lost weakening the glittering effect.

Another defect of the drawing material using the wax as a base material is that the glitter that is transferred onto the surface of the object tends to be easily peeled off. The glitter transferred onto the surface of the object simply remains adhered thereto together with the wax which is the base material of the drawing material and is easily peeled off when touched by, for example, hand. This tendency becomes conspicuous when the glitter has a larger size to produce a higher glittering effect.

On the other hand, the latter commercially available product is used by being squeezed out from the tube and is spread by fingers. This, however, is cumbersome to use.

SUMMARY OF THE INVENTION

It is therefore an object of the present invention to provide a solid glitter marker which, in its form, can be used to favorably draw a picture on an object such as a paper, the picture that is drawn exhibiting a glittering effect on a transparent background and being intimately adhered to the object maintaining resistance against being peeled off.

Another object of the present invention is to provide a drawing material which permits the glitter to be excellently transferred onto the drawing surface, the glitter being excellently adhered to the drawing surface and an exhibiting excellent glittering effect.

A further object of the present invention is to provide a solid glitter marker using a glitter exhibiting a higher glittering effect and having a larger size.

According to the present invention, there is provided a solid glitter marker comprising a gel-forming material that contains (A) at least one kind of gelling agent selected from the group consisting of a dibenzylidene sorbitol, derivatives thereof, tribenzylidene sorbitol and derivatives thereof, (B) water, (C) a water-miscible organic solvent, (D) a high-molecular adhesive, and (E) a glitter, the gel-forming material having a bending strength under JIS S-6026 of 160 to 700 g and a crushing strength which is not larger than 10 times as large as the bending strength.

It is desired that the solid glitter marker of the present invention contains the gelling agent (A) in an amount of from 1 to 4% by weight, preferably, from 2 to 3% by weight, the water (B) in an amount of from 10 to 40% by weight, preferably, from 25 to 35% by weight, the organic solvent (C) in an amount of from 35 to 50% by weight and, preferably, from 40 to 45% by weight, the high-molecular adhesive (D) in an amount of from 3 to 25% by weight and, preferably, from 5 to 15% by weight, and the glitter (E) in an amount of from 1 to 20% by weight and, preferably, from 5 to 15% by weight.

It is desired that the solid glitter marker of the present invention, further, contains (F) a polyvinyl alcohol in addition to the above-mentioned essential components. The glitter marker may further contain (G) a coloring agent.

DETAILED DESCRIPTION OF THE PREFERRED EMBODIMENT

The solid glitter marker of the present invention comprises a gel-forming material which contains (A) at least one kind of gelling agent selected from the group consisting of a dibenzylidene sorbitol, derivatives thereof, tribenzylidene sorbitol and derivatives thereof, (B) water, (C) a water-miscible organic solvent, (D) a high-molecular adhesive, and (E) a glitter, and has a feature in that a bending strength under JIS S-6026 is 160 to 700 g and a crushing strength is not larger than 10 times as large as the bending strength.

Figure 1:
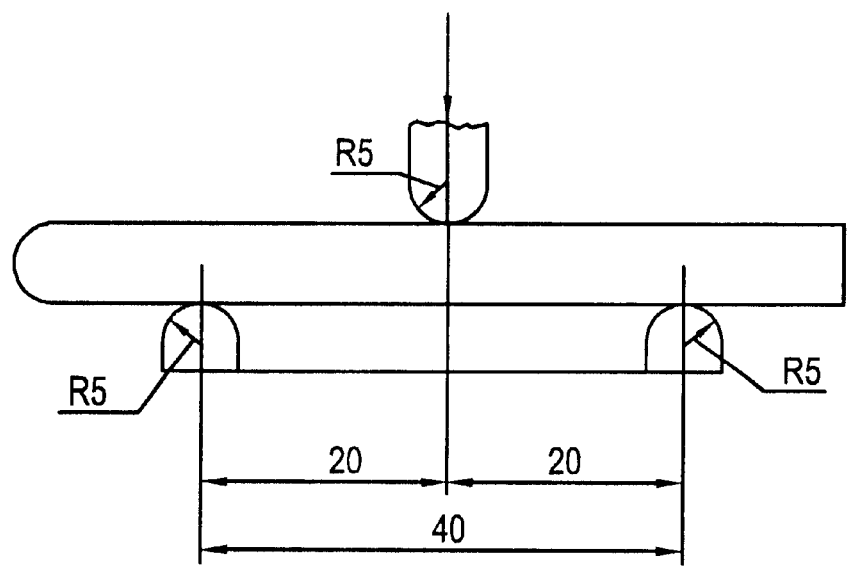
FIG. 1 is a diagram illustrating a manner of exerting a load on a device for measuring the bending strength.

The bending strength is measured at a temperature of 20~25° C. according to the JIS S-6026. The sample is put into a container, maintained at room temperature of 20 to 25° C. and is, then, measured by a method described below. The above JIS specifies the measuring temperature to be 37° C. At 37° C., however, the solvent volatilizes much during the measurement, causing the value of measurement to vary. Therefore, the above temperature is employed. The sample is laid on two fulcrums that are placed on a platform weighing machine a shown in FIG. 1, and the load is exerted on the center of the sample, and the load with which the sample is broken is measured. In FIG. 1, numerals are in a unit of millimeters.

Figure 2:
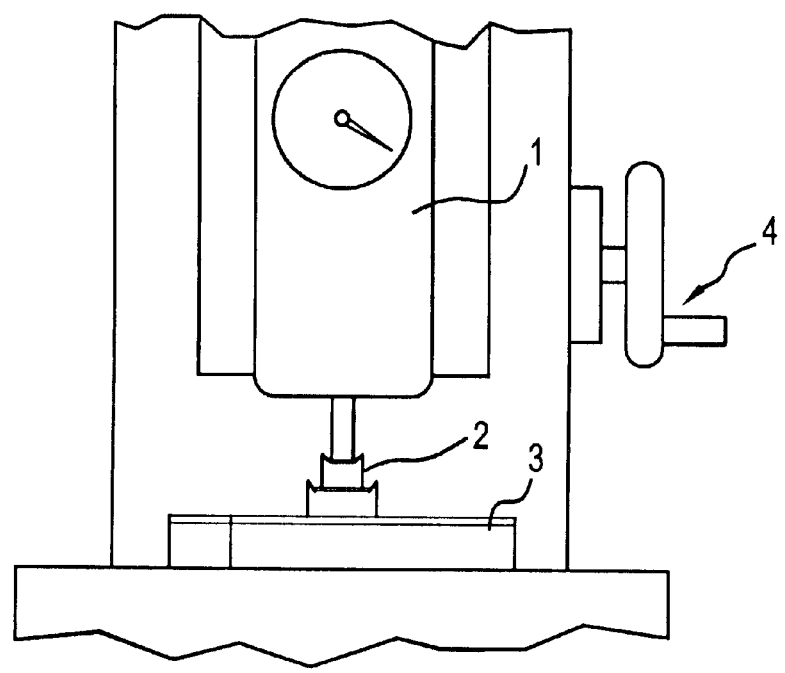
FIG. 2 is a diagram illustrating a device for measuring the crushing strength.

The crushing strength of the sample is measured by using a device shown in FIG. 2. An accessory disk 2 having a diameter of 12 mm is set to a push-pull gauge 1 of the device for measuring the crushing strength, and the gauge is adjusted to a zero point. While maintaining the measuring temperature at 20 to 25° C., the sample is placed right under the disk 2 on a platform, and a handle 4 is turned to lower the disk 2. After having come into contact with the sample, the disk 2 is lowered at a speed of 1 mm/sec (0.5 turns/sec). The sample deforms, and the load at a moment when the gauge ceases to change is recorded.

It is important that the solid glitter marker of the present invention comprises the gel-forming material having a bending strength and a crushing strength within the above-mentioned ranges from the standpoint of drawing pictures and transfer property of the glitter onto the drawing surface. When the bending strength becomes smaller than 160 g, the molded article tends to be easily broken and is too weak to be used as the solid drawing material. When the bending strength exceeds 700 g, on the other hand, the glitter tends to be driven into the gel-forming material and is not smoothly transferred onto the drawing surface. According to the present invention, the bending strength of the gel-forming material is selected to lie in a range of 160 to 700 g and, more preferably, 180 to 500 g, so that the stick is not excessively collapsed during the drawing, making it possible to smoothly draw the pictures while permitting the glitter to be smoothly and reliably transferred onto the drawing surface.

It is further important that the gel-forming material has a crushing strength which is not larger than 10 times as large as the bending strength from the standpoint of drawing property and transfer of the marker to the drawing surface. When the crushing strength of the gel-forming material becomes greater than 10 times as large as the bending strength, the gel-forming material acquires elasticity and undergoes soft and limp deformation at the time of drawing a picture to spoil the feeling of drawing and suppressing the transfer of the marker onto the drawing surface.

In the present invention, the gelling agent (A) in the gel-forming material is at least one gelling agent selected from the group consisting of a dibenzylidene sorbitol, derivatives thereof, tribenzylidene sorbitol and derivatives thereof. Use of this gelling agent makes it possible to basically obtain a gel-forming material having a bending strength and a crushing strength lying within the above-mentioned ranges, the gel-forming material offering an advantage of drawing a picture maintaining excellent transparency.

The dibenzylidene sorbitol is the one in which 2 moles of a benzaldehyde is bonded to a mol of a sorbitol, and its formal chemical name is 1.3, 2.4-dibenzylidene sorbitol. Its derivatives have a substituent such as methyl group, ethyl group or isobutyl group introduced into a benzene ring of the benzylidene group. Further, the tribenzylidene sorbitol is the one in which 3 mols of the benzaldehyde is bonded to a mol of the sorbitol, and its derivatives have a substituent such as methyl group, ethyl group or isobutyl group introduced into a benzene ring of the benzylidene group.

When heated in the presence of water and a water-miscible organic solvent, these gelling agents dissolve therein and turn into a sol and, when cooled, turn into a gel. It has been considered that these gelling agents are highly safe and are excellent in their chemical stability.

Among them, the dibenzylidene sorbitol is preferred.

It is desired that the gelling agent (A) exists in the gel-forming material in an amount of, preferably, from 1 to 4% by weight and, more preferably, from 2 to 3% by weight. When the amount becomes smaller than the above range, the gel strength is small and the stick easily collapses. When the amount exceeds the above range, the gelling agent does not all dissolve but precipitates causing the composition to become nonhomogeneous.

The gel-forming material of the present invention contains the water (B). That is, a suitable amount of water is desirable since it heightens the strength of the gel and makes the stick containing an organic solvent to be self-fire-extinguishing. The water (B) exists in the gel-forming material in an amount of, preferably, from 10 to 40% by weight and, more preferably, from 25 to 35% by weight. When the amount of water is smaller than the above range, its effect is poorly exhibited. When the amount of water exceeds the above range, the gelling agent precipitates causing the composition to become nonhomogeneous, which is not desirable.

The gel-forming material of the present invention contains an organic solvent (C). Any organic solvent may be used provided it is miscible with the water, dissolves the gelling agent when heated, and forms the gel when cooled. Examples of the organic solvent (C) include alcohol solvents such as ethyl alcohol, butyl alcohol, benzyl alcohol, 2-ethyl hexanol and isopropyl alcohol; glycol solvents such as ethylene glycol and propylene glycol; glycol ether solvents such as methoxyethanol, ethoxyethanol, methoxypropanol, isopropoxyethanol, ethoxybutanol, 3-methyl-3-methoxy-1-butanol; and ketone solvents such as methyl ethyl ketone, cyclohexanone and methyl isobutyl ketone.

Among them, it is desired to use glycol ether solvents having a suitable degree of dissolving power and a boiling point. Among them, the methoxypropanol, i.e., the 1-methoxy-2-propanol is preferably used.

It is desired that the organic solvent (C) is present in the gel-forming material in an amount of, preferably, from 35 to 50% by weight and, more preferably, from 40 to 45% by weight. When the amount of the organic solvent is smaller than the above range, the gelling agent cannot be dissolved, which is not desirable. When the amount of the organic solvent exceeds the above range, the gel loses the strength, which is not desirable, either.

The gel-forming material of the present invention contains the high-molecular adhesive (D). The high-molecular adhesive (D) works to strongly adhere the glitter to the surface of the object and, further, works to transfer the glitter onto the surface of the object without slipping even when the surface of the object is very smooth. Any high-molecular adhesive can be used provided it dissolves in the water and in the organic solvent, and exhibits adhesiveness after drying. For example, there can be used a semi-synthesized cellulose derivative such as a methyl cellulose, an ethyl cellulose or a hydroxyethyl cellulose, a polyvinyl pyrrolidone, a copolymer of the polyvinyl pyrrolidone and an acrylic acid, or vinyl-type high molecules such as a polyvinyl acetate emulsion. Among them, the polyvinyl pyrrolidone is suited.

It is desired that the high-molecular adhesive (D) exists in the gel-forming material in an amount of, preferably, from 3 to 25% by weight and, more preferably, from 5 to 15% by weight. When the amount of the high-molecular adhesive is smaller than the above range, the adhesive force is not enough and the glitter tends to be peeled off the picture that is drawn. Besides, it becomes impossible to draw a picture on the smooth surfaces. When the amount of the high-molecular adhesive exceeds the above range, on the other hand, the solution in which the high molecules are dissolved exhibits a too increased viscosity and makes it difficult to prepare the gel-forming material.

The gel-forming material of the present invention contains a glitter (E). The glitter is obtained by evaporating aluminum on a polyethylene terephthalate film and, further, imparting a color thereon when it is desired to obtain the glitter having a chromatic color. The glitter has a size that is very larger than that of a pigment that is usually used for the drawing materials, i.e., has a size of from 0.008×0.008 mm through up to about 1.5×1.5 mm. The thickness is about one-tenth the length of the side. The glitter may have various hues such as of no color, green, light green, royal blue, sky blue, light blue, pink, red, yellow, etc.

It is desired that the glitter that is used has a size of not larger than 0.3 mm×0.3 mm. When the size of the glitter exceeds the above range, the writing feeling becomes rugged which is not desirable. According to the present invention, however, it is allowed to use the glitter of a size larger than that used in the conventional glitter markers of this kind and, hence, the glittering feeling in the drawn picture can be enhanced.

The glitter (E) exists in the gel-forming material in an amount of, preferably, from 1 to 20% by weight and, more preferably, from 5 to 15% by weight When the amount of the glitter is smaller than the above-mentioned range, the glittering effect is poor. When the amount of the glitter exceeds the above range, on the other hand, the writing feeling becomes rugged, which is not desirable.

It is desired that the gel-forming material of the present invention contains (F) a polyvinyl alcohol in addition to the above-mentioned components. As the polyvinyl alcohol, there can be used the one called completely saponified type having a saponification degree of not smaller than 96% or the one called partly saponified type having a saponification degree of from 72 to 95%.

Upon being blended with the polyvinyl alcohol (F), the sticky feeling can be decreased on the surface of the stick, and the stick can be easily delivered from the holder.

The polyvinyl alcohol (F) is contained in the gel-forming material in an amount of, desirably, from 1 to 5% by weight and, more preferably, from 3 to 4% by weight. When the amount of the polyvinyl alcohol is smaller than the above range, the above-mentioned effect is poorly exhibited. When the amount of the polyvinyl alcohol exceeds the above range, on the other hand, the crushing strength of the stick becomes so large that the glitter tends to be less transferred onto the surface of the object.

The gel-forming material of the present invention may contain (G) a coloring agent in addition to the above-mentioned components. That is, the stick as a whole may be colored by using a pigment or a dye. It is desired that the pigment is dispersed in advance together with a dispersant by using a ball mill or the like. It is allowable to use a commercially available dispersion pigment, as a matter of course.

When the amount of the coloring agent (G) is too large, lustre of the glitter is impaired. It is therefore desired that the coloring agent is used in an amount of not larger than 1% by weight as a solid content.

The gel-forming material of the present invention is prepared by mixing and heating the above-mentioned components with stirring, dissolving therein, the gelling agent, the high-molecular adhesive and the polyvinyl alcohol, and pouring the resulting sol solution into a mold, followed by cooling. The heating temperature is suitably in a range of from 80 to 95° C. though it may vary depending upon the kinds of the components and the ratio of the blending amounts.

The bending strength of the obtained gel-forming material can be set to a predetermined value by adjusting the mixing ratio of the water and the organic solvent in relation to the amount of blending the gelling agent. Further, the crushing strength of the obtained gel-forming material can be set to a predetermined value by adjusting the amount of blending the high-molecular adhesive and further adjusting the amount of blending the polyvinyl alcohol.

The gel-forming material of the present invention is contained in a holder with a cap of the end delivery type, and its end is delivered to draw glittering marks.

EXAMPLES

Example 1

| Recipe: | pts by wt |
| --- | --- |
| Water | 31 |
| 1-Methoxy-2-propanol | 44 |
| Dibenzylidene sorbitol | 2 |
| Polyvinyl pyrrolidone (molec wt, 110,000) | 8 |
| Polyester glitter (0.15 × 0.15 mm) | 9 |
| Polyvinyl alcohol (saponification deg, 87%) (polymerization degree, 1000 to 1500) | 1 |
| Pigment-dispersed solution (C.I. Pigment Blue 15, 10%) | 5 |

All of the above materials were introduced into a flask equipped with a thermometer, a stirrer and a refluxing device, and were heated up to 90° C. with stirring. This temperature was maintained for about 30 minutes to completely dissolve the high-molecular adhesive and the gelling agent. The molten material was poured into a delivery-type container and was left to cool while attaching a cap thereto to obtain a solid drawing material containing the glitter in the form of a stick 8 mm in diameter and 51 mm in length.

Properties of the drawing material were as shown in Table 1.

Example 2

A glitter marker was prepared in the same manner as in Example 1 but changing the recipe in a manner as shown in Table 1. The obtained results were as shown in Table 1.

Comparative Example 1

A glitter marker was prepared in the same manner as in Example 1 but changing the recipe in a manner as shown in Table 1. The obtained results were as shown in Table 1.

Comparative Example 2

A glitter marker was prepared in the same manner as in Example 1 but changing the recipe in a manner as shown in Table 1. The obtained results were as shown in Table 1.

Comparative Example 3

A glitter marker was prepared in the same manner as in Example 1 but changing the recipe in a manner as shown in Table 1. The obtained results were as shown in Table 1.

TABLE 1

Solid glitter marker

|  | Example 1 | Example 2 | Comparative Example 1 | Comparative Example 2 | Comparative Example 3 |
|---|---|---|---|---|---|
| Water | 31 | 27 | 40 | 27 | 5 |
| 1-Methoxy-2-propanol | 44 | 42 | 35 | 42 | 62 |
| Dibenzylidene sorbitol | 2 | 3 | 2 | 3 | 4 |
| Polyvinyl pyrrolidone (molecular weight 110,000) | 8 | 11 | 8 | 9 | 12 |
| Polyester glitter (0.15 × 0.15 mm) | 9 | 9 | 9 | 9 | 9 |
| Polyvinyl alcohol (saponification degree 87%, polymerization degree 1000–1500) | 1 | 4 | 1 | 6 | 3 |
| Pigment-dispersed solution (C.I. pigment blue 15 10%) | 5 | 0 | 5 | 0 | 5 |
| Pigment-dispersed solution (C.I. pigment green 7 10%) | 0 | 4 | 0 | 4 | 0 |
| Sum | 100 | 100 | 100 | 100 | 100 |
| Bending strength (g) | 205 | 280 | 110 | 210 | 110 |
| Crushing strength (g) | 1,500 | 1,900 | 1,200 | 2,900 | 650 |
| Collapse of stick during drawing | almost nothing | almost nothing | collapsed greatly | no picture could be drawn | collapsed greatly |
| Adhesiveness of glitter to object | good | good | good | no picture could be drawn | good |
| Condition of film | smooth | smooth | nonuniform | no picture could be drawn | nonuniform |
| Combustibility | self-extinguished | self-extinguished | self-extinguished | self-extinguished | combustible |

What is claimed is:

1. A solid glitter marker comprising a gel-forming material that contains (A) at least one kind of gelling agent selected from the group consisting of a dibenzylidene sorbitol, derivatives thereof, tribenzylidene sorbitol and derivatives thereof, (B) water, (C) a water-miscible organic solvent, (D) a high-molecular adhesive and (E) a glitter, the gel-forming material having a bending strength at a temperature of 20–25° C., when employing the method for application of a load described in paragraph 6.5 of Japanese Industrial Standard JIS S-6026, of 160 to 700 g, and a crushing strength which is not larger than 10 times as large as the bending strength.

2. A glitter marker according to claim 1, wherein the gelling agent (A) is contained in an amount of from 1 to 4% by weight, the water (B) is contained in an amount of from 10 to 40% by weight, the organic solvent (C) is contained in an amount of from 35 to 50% by weight, the high-molecular adhesive (D) is contained in an amount of from 3 to 25% by weight, and the glitter (E) is contained in an amount of from 1 to 20% by weight.

3. A glitter marker according to claim 1, wherein the gelling agent (A) is contained in an amount of from 2 to 3% by weight, the water (B) is contained in an amount of from 25 to 35% by weight, the organic solvent (C) is contained in an amount of from 40 to 45% by weight, the high-molecular adhesive (D) is contained in an amount of from 5 to 15% by weight, and the glitter (E) is contained in an amount of from 5 to 15% by weight.

4. A glitter marker according to claim 1, wherein the gelling agent (A) is a dibenzylidene sorbitol.

5. A glitter marker according to claim 1, wherein the organic solvent (C) is a 1-methoxy-2-propanol.

6. A glitter marker according to claim 1, wherein the high-molecular adhesive (D) is a polyvinyl pyrrolidone.

7. A glitter marker according to claim 1, wherein the glitter is a polyester glitter having a size of not larger than 0.3 mm×0.3 mm.

8. A glitter marker according to claim 1, wherein (F) a polyvinyl alcohol is further contained.

9. A glitter marker according to claim 1, wherein the polyvinyl alcohol (F) is contained in an amount of from 1 to 5% by weight.

10. A glitter marker according to claim 1, wherein (G) a coloring agent is further contained.

* * * * *